United States Patent
Yamaguchi et al.

(10) Patent No.: US 9,878,722 B2
(45) Date of Patent: Jan. 30, 2018

(54) MONITORING DEVICE AND MONITORING SYSTEM

(71) Applicant: FUJI XEROX CO., LTD., Tokyo (JP)

(72) Inventors: Shoji Yamaguchi, Kanagawa (JP); Masayasu Takano, Kanagawa (JP); Kaoru Yasukawa, Kanagawa (JP); Ryosuke Nakanishi, Kanagawa (JP); Yuki Katada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/148,197

(22) Filed: May 6, 2016

(65) Prior Publication Data

US 2017/0137034 A1 May 18, 2017

(30) Foreign Application Priority Data

Nov. 17, 2015 (JP) .................. 2015-225093

(51) Int. Cl.

| | |
|---|---|
| *G01M 17/00* | (2006.01) |
| *G07C 5/08* | (2006.01) |
| *B60W 50/00* | (2006.01) |
| *B60W 40/02* | (2006.01) |
| *B60W 40/12* | (2012.01) |
| *B60W 10/20* | (2006.01) |
| *B60W 10/18* | (2012.01) |
| *B60W 10/10* | (2012.01) |
| *B60W 10/04* | (2006.01) |

(Continued)

(52) U.S. Cl.
CPC ........ *B60W 50/0098* (2013.01); *B60W 40/02* (2013.01); *B60W 40/12* (2013.01); *B60Q 1/04* (2013.01); *B60S 1/06* (2013.01); *B60W 10/04* (2013.01); *B60W 10/10* (2013.01); *B60W 10/18* (2013.01); *B60W 10/20* (2013.01); *B60W 2560/02* (2013.01)

(58) Field of Classification Search
CPC .. B60W 50/0098; B60W 40/02; B60W 40/12; B60W 10/20; B60W 10/10; B60W 10/04; B60W 10/18; B60W 2560/02; B60Q 1/04; B60S 1/06; G05B 23/0283
See application file for complete search history.

(56) References Cited

U.S. PATENT DOCUMENTS

| | | | | |
|---|---|---|---|---|
| 7,535,347 B2* | 5/2009 | Larson | .............. | G01M 17/0072 340/438 |
| 8,050,814 B2* | 11/2011 | Rains | ...................... | F16H 57/04 340/457.4 |

(Continued)

FOREIGN PATENT DOCUMENTS

JP 2010-014498 A 1/2010

*Primary Examiner* — Michael J Zanelli
(74) *Attorney, Agent, or Firm* — Oliff PLC

(57) ABSTRACT

A monitoring device includes an estimation unit, a detection unit, and a correction unit. The estimation unit estimates a degree of degradation of a moving object based on at least an amount of movement of the moving object. The detection unit detects an environment state of the moving object at a time when the moving object is moved, as operation parameter values including an amount of an operation at a time when an operation unit is operated and an operation time. The correction unit corrects the degree of degradation, which is estimated by the estimation unit, based on the operation parameter values detected by the detection unit.

17 Claims, 16 Drawing Sheets

(51) Int. Cl.
*B60Q 1/04* (2006.01)
*B60S 1/06* (2006.01)

(56) References Cited

U.S. PATENT DOCUMENTS

| | | | |
|---|---|---|---|
| 8,063,793 B2 * | 11/2011 | Shrum, Jr. | G08G 1/127 340/501 |
| 8,396,621 B2 * | 3/2013 | Maesse | F01N 3/2066 701/29.4 |
| 8,643,483 B2 * | 2/2014 | Oh | B60R 16/0234 340/438 |
| 2010/0057479 A1 * | 3/2010 | De | G06Q 10/20 705/305 |
| 2012/0150381 A1 * | 6/2012 | Nath | G07C 5/085 701/29.4 |

* cited by examiner

CHARACTERISTIC GRAPH ILLUSTRATING CLUTCH REPLACEMENT SITUATIONS (EXEMPLARY EMBODIMENT)

IN CASE WHERE TRAVEL DISTANCES (70,000 KM, 120,000 KM, AND 180,000 KM) ARE USED AS REPLACEMENT TIMES WHICH ARE DETERMINED BASED ON TRAVEL DISTANCES M1, M2, AND M3 OF CLUTCHES 1, 2, AND 3 AT WHICH SET LIFE WEAR RATE (50%) IS REACHED, ALL CLUTCHES 1, 2, AND 3 ARE REPLACED AT LIFE WEAR RATE (50%)

FIG. 6B

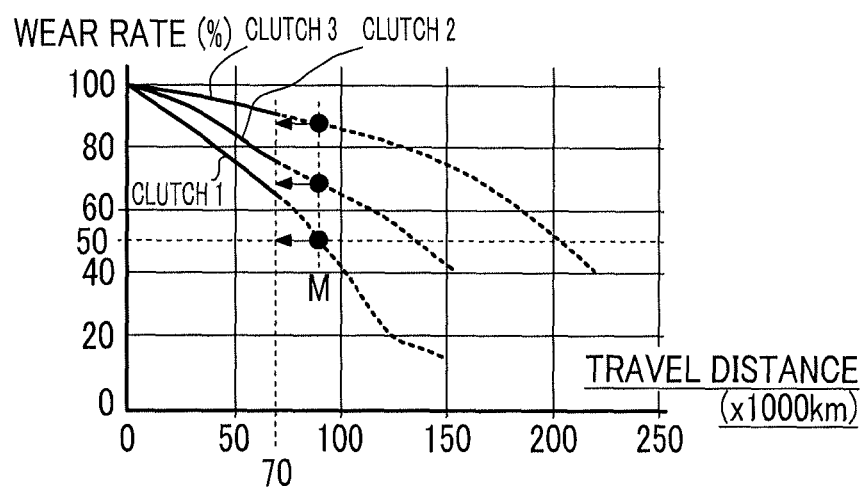

CHARACTERISTIC GRAPH ILLUSTRATING CLUTCH
REPLACEMENT SITUATIONS (COMPARATIVE EXAMPLE)

IN CASE WHERE TRAVEL DISTANCE (70,000 KM) IS USED AS REPLACEMENT TIME WHICH IS DETERMINED BASED ON SHORTEST TRAVEL DISTANCE M1 OF CLUTCH 1 AT WHICH LIFE SETTING WEAR RATE (50%) IS REACHED, CLUTCH 1 IS REPLACED AT LIFE WEAR RATE (50%), AND IN CONTRAST, CLUTCHES 2 AND 3 ARE REPLACED EVEN IF LIFE WEAR RATE (50%) IS NOT REACHED

CHARACTERISTIC GRAPH ILLUSTRATING RELATIONSHIP BETWEEN
REPLACEMENT TRAVEL DISTANCE AND CORRECTION COEFFICIENT

FIG. 7B

| COMPARISON TABLE ILLUSTRATING TRAVEL DISTANCE REPLACEMENT TIME VERSUS NUMBER OF OPERATIONS OF CLUTCH | | |
|---|---|---|
| NUMBER OF OPERATIONS OF CLUTCH (X 1,000) | TRAVEL DISTANCE (X 1,000 KM) | |
| 1,000 | 70 | CLUTCH 1 (STANDARD) |
| 880 | 120 | CLUTCH 2 (FIG. 5) |
| 800 | 150 | CLUTCH 4 (TABLE 3) |
| 690 | 180 | CLUTCH 3 (FIG. 5) |
| 600 | 200 | CLUTCH 5 (TABLE 3) |

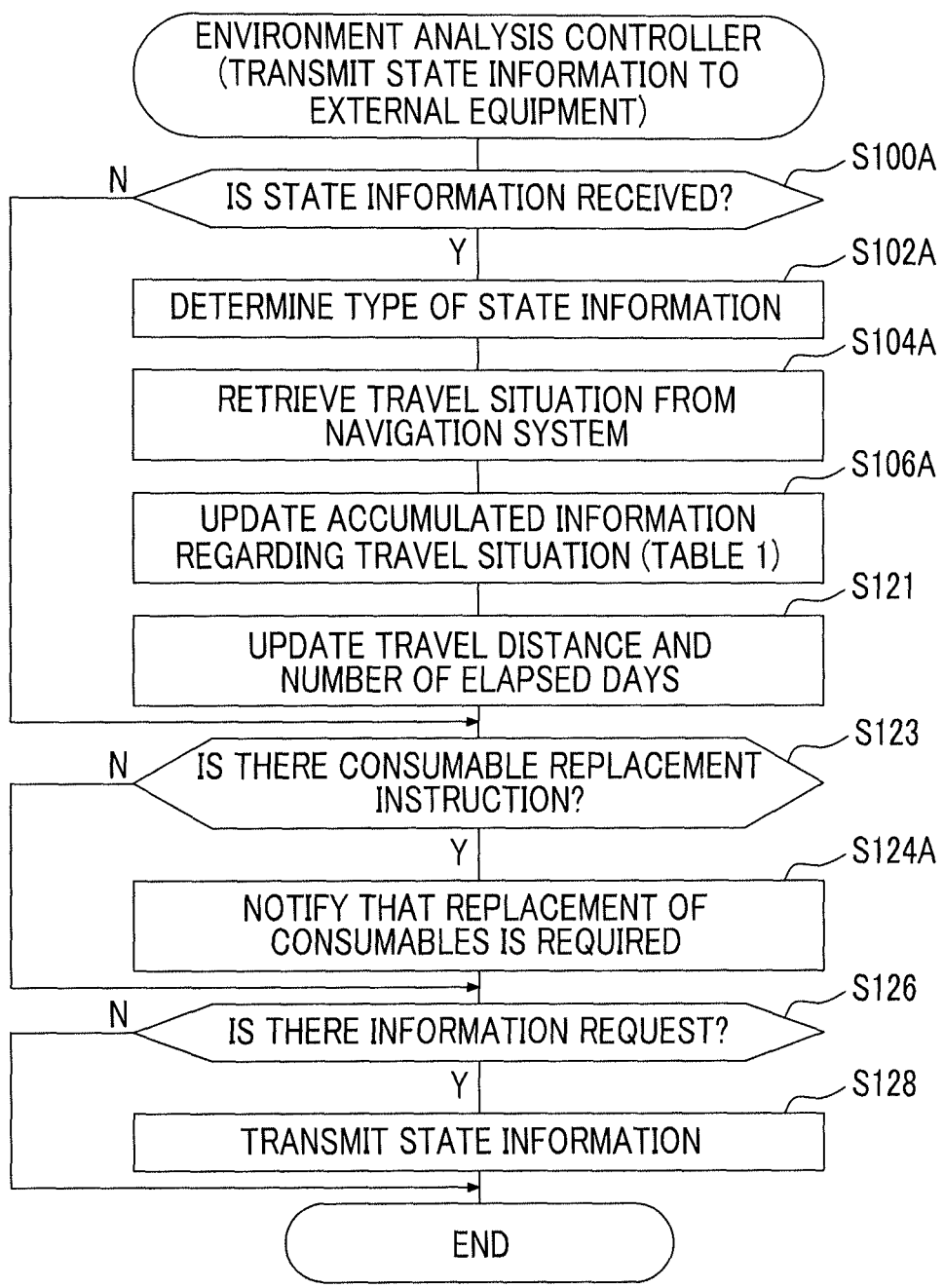

INFORMATION REGARDING NUMBER OF STEERING WHEEL TURNS
(MAXIMUM RIGHT AND LEFT TURNS OF ± 2.7 / STEERING ANGLE 30° )

CHARACTERISTIC GRAPH ILLUSTRATING RELATIONSHIP BETWEEN
NUMBER OF STEERING WHEEL TURNS AND FAILURE RATE

CHARACTERISTIC GRAPH ILLUSTRATING
TRANSITION OF SHIFT POSITION

CHARACTERISTIC GRAPH ILLUSTRATING RELATIONSHIP BETWEEN
NUMBER OF TIMES VEHICLE IS IN "FIRST GEAR" AND FAILURE RATE

CHARACTERISTIC GRAPH ILLUSTRATING RELATIONSHIP BETWEEN TIME
PERIOD FOR WHICH VEHICLE IS IN "FIRST GEAR" AND FAILURE RATE

MONITORING DEVICE AND MONITORING SYSTEM

CROSS-REFERENCE TO RELATED APPLICATIONS

This application is based on and claims priority under 35 USC 119 from Japanese Patent Application No. 2015-225093 filed Nov. 17, 2015.

BACKGROUND

Technical Field

The present invention relates to a monitoring device and a monitoring system.

SUMMARY

According to an aspect of the invention, a monitoring device includes an estimation unit, a detection unit, and a correction unit. The estimation unit estimates a degree of degradation of a moving object based on at least an amount of movement of the moving object. The detection unit detects an environment state of the moving object at a time when the moving object is moved, as operation parameter values including an amount of an operation at a time when an operation unit is operated and an operation time. The correction unit corrects the degree of degradation, which is estimated by the estimation unit, based on the operation parameter values detected by the detection unit.

BRIEF DESCRIPTION OF THE DRAWINGS

Exemplary embodiments of the present invention will be described in detail based on the following figures, wherein:

FIGS. 6A and 6B are characteristic graphs illustrating clutch replacement situations according to the first exemplary embodiment, FIG. 6A illustrates the exemplary embodiment, and FIG. 6B illustrates a comparative example;

FIG. 7B is a comparison table illustrating a replacement time versus the number of operations of a clutch pedal, according to the first exemplary embodiment;

FIG. 10A is a flowchart illustrating control for managing consumable replacement based on the collection and notification of state information, which is executed by the environment analysis controller of each vehicle;

DETAILED DESCRIPTION

First Exemplary Embodiment
Configuration of Vehicle

Figure 1:
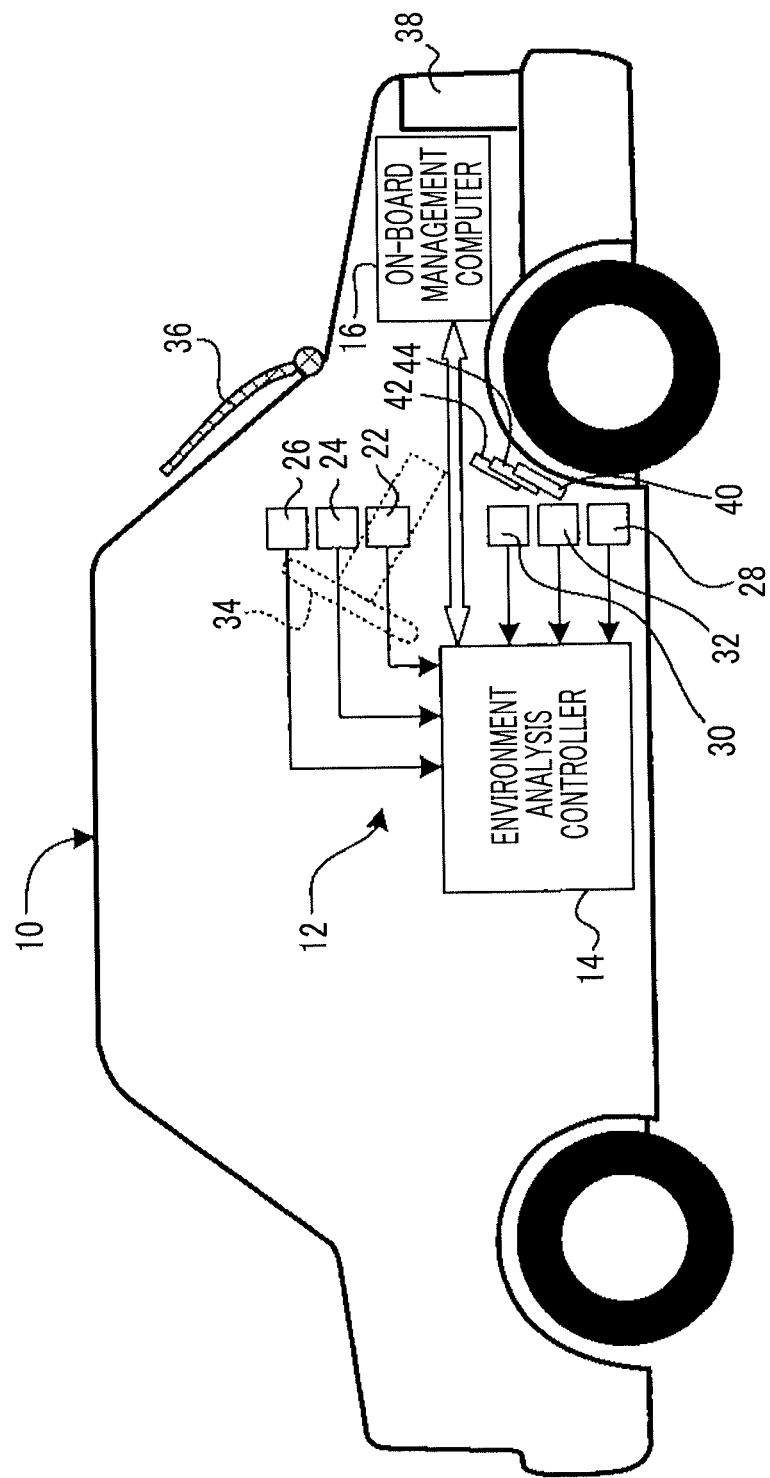
FIG. 1 is a side view of a vehicle which is a moving object according to a first exemplary embodiment.

FIG. 1 is a side view of a vehicle 10 according to a first exemplary embodiment. A moving object is mainly applied to transport including trains, automobiles, ships, and aircrafts which carry passengers and freight. In the first exemplary embodiment, an automobile (hereinafter, referred to as a "vehicle 10") is illustrated as an example of a moving object.

A monitoring device 12 is mounted in the vehicle 10, and monitors consumables based on storage and a travel environment of the vehicle 10.

The monitoring device 12 includes an environment analysis controller 14. The environment analysis controller 14 is connected to an on-board management computer 16 that is originally mounted in the vehicle 10.

Figure 4:
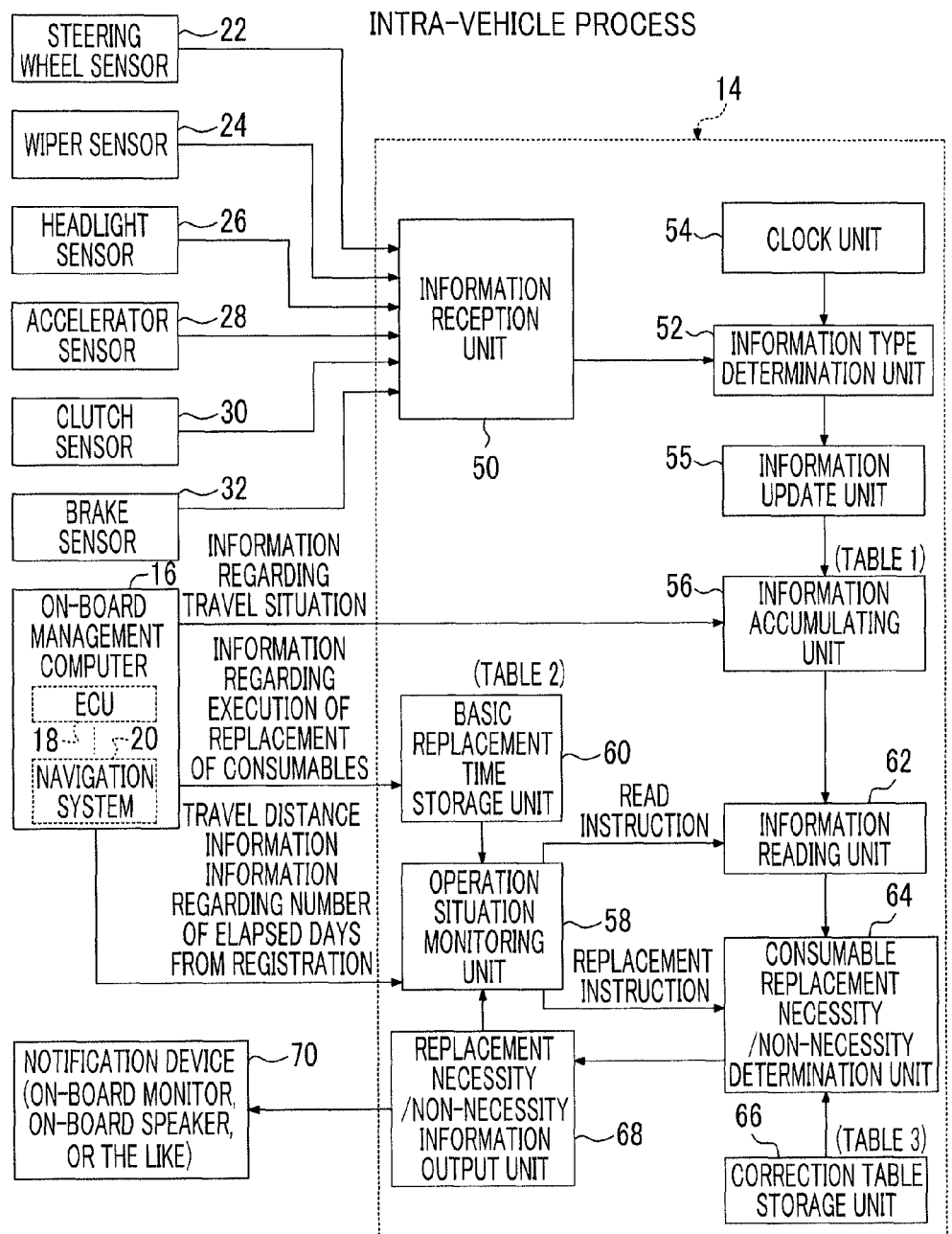
FIG. 4 is a functional block diagram of an environment analysis controller that executes control for analyzing state information and determining a consumable replacement time, according to the first exemplary embodiment.

The on-board management computer 16 includes an engine control unit (ECU) 18 and a navigation system 20 (refer to FIG. 4).

From the on-board management computer 16, the environment analysis controller 14 acquires information regarding a travel situation, information regarding the travel distance of the vehicle (travel distance information), information regarding the number of elapsed days after registration, and information regarding execution of replacement of consumables. The travel situation is a combination of traveled road surfaces (surfaces of roads including an expressway, a general paved road, a general unpaved road, and a mountain road) and time zones (day and night). For example, the travel situation may be acquired from the navigation system 20 which is a part of the on-board management computer 16.

The environment analysis controller 14 is connected to the following detectors: a steering wheel sensor 22; a wiper sensor 24; a headlight sensor 26; an accelerator sensor 28; a clutch sensor 30; and a brake sensor 32.

The steering wheel sensor 22 detects the state of rotation of a steering wheel 34 of the vehicle 10.

The wiper sensor 24 detects an operation state of a wiper 36 of the vehicle 10.

The headlight sensor 26 detects an on/off state of a headlight 38 of the vehicle 10.

The accelerator sensor 28 detects the state of a pressing operation (for example, the number of operations) of an accelerator pedal 40 of the vehicle 10.

The clutch sensor 30 detects the state of a pressing operation (for example, the number of operations) of a clutch pedal 42 of the vehicle 10.

The brake sensor 32 detects the state of a pressing operation (for example, the number of operations) of a brake pedal 44 of the vehicle 10.

The environment analysis controller 14 determines the replacement times of consumables of the vehicle 10 by accumulating and analyzing the information regarding a travel situation, the information regarding the travel distance of the vehicle, the information regarding the number of elapsed days after registration, and the information regarding execution of replacement of consumables which are acquired from the on-board management computer 16, and state information which is acquired from various sensors such as the steering wheel sensor 22, the wiper sensor 24, the headlight sensor 26, the accelerator sensor 28, the clutch sensor 30, and the brake sensor 32.

The information regarding a travel situation is acquired from the navigation system 20; however, a travel situation may be estimated based on an analysis result of the state information from the various sensors.

For example, the consumables of the vehicle 10 are the clutch pedal (including a clutch plate and peripheral components thereof) 42, brake pads, engine oil, a battery, belts (including various timing belts), and spark plugs (hereinafter, referred to as example components). The consumables are not limited to the aforementioned example components, and may include tires (wear and air pressure), oil pressure systems (brake oil system and the like), brake calipers, axle boots, distributors, and the like. In the first exemplary embodiment, the aforementioned example components will be described.

Typically, maintenance or component replacement times of the vehicle 10 are set based on the travel distance and the number of elapsed days of the vehicle 10.

Figure 2A:
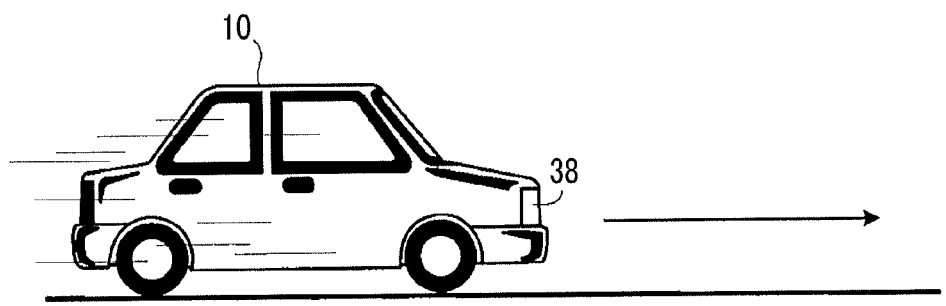
FIGS. 2A and 2B are side views illustrating travel states of the vehicle according to the first exemplary embodiment which is an example of a moving object in which components consumed due to operation are used.
Figure 2B:
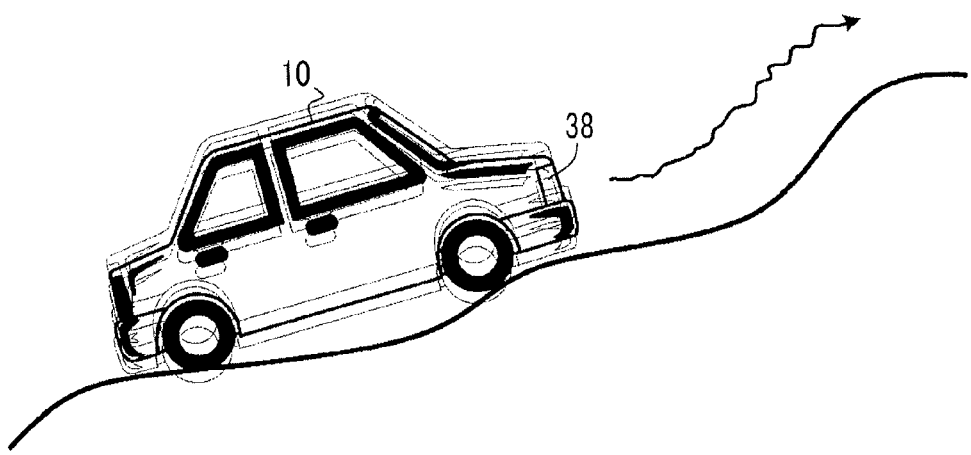

FIGS. 2A and 2B illustrate travel states of the vehicle 10 which is an example of a moving object in which components consumed due to operation are used.

Travel Situation

FIG. 2A illustrates a state in which the vehicle 10 is traveling on an expressway or a general paved road, and FIG. 2B illustrates a state in which the vehicle 10 is traveling on a sloped road or an unpaved road.

The travel situation of the vehicle 10 may be factors which affect the maintenance or the component replacement times. For example, the number of shift changes, the number of steering wheel turns (angle), the number of brake operations, and the number of accelerator-pedal presses considerably differs between the travel state illustrated in FIG. 2A and the travel state illustrated in FIG. 2B.

Figure 3A:
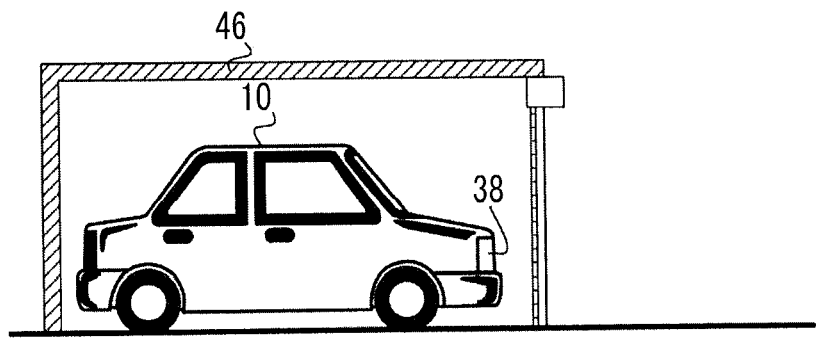
FIGS. 3A to 3C are side views of the vehicle in various surrounding environmental states according to the first exemplary embodiment.
Figure 3B:
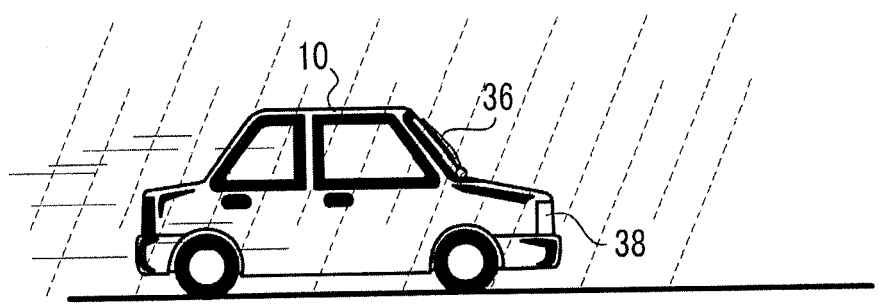
Figure 3C:
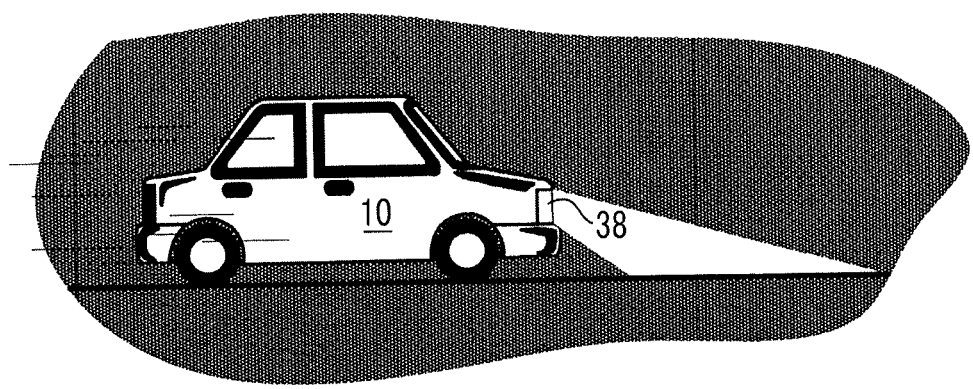

FIGS. 3A to 3C illustrate surrounding environmental states of the vehicle 10.

FIG. 3A illustrates an environment in which the vehicle 10 is stored on a parking lot or a storehouse 46 such as a garage and is not moved with the engine turned off.

FIG. 3B illustrates an environment in which the vehicle 10 is traveling in very bad weather (rain, snow, or the like) and the wipers 36 are operated.

FIG. 3C illustrates an environment in which the vehicle 10 is traveling at night or in a tunnel and the headlights 38 are turned on.

As illustrated in FIGS. 3A to 3C, operation environments affect configuration components of the vehicle 10 considerably differently.

An environment of the vehicle may become a factor which affects the component replacement times. For example, in a case where the vehicle has been stored in a garage or the like without being operated for a long period of time, the position of the tires is not moved such that partial damage is likely to occur (refer to FIG. 3A).

In a case where a rate of travel in very bad weather is high, the components are more likely to be serviced or deterioration of painting is more likely to progress due to dirt or humidity compared to a case in which a rate of travel in good weather is high (refer to FIG. 3B).

In a case where a rate of travel at night or in a tunnel is high, the life of the battery or lamps is more likely to be reduced compared to a case in which a rate of travel during day (refer to FIG. 3C).

In the first exemplary embodiment, the monitoring device 12 is mounted in the vehicle 10 so as to ascertain (estimate) operation environments (travel situations and surrounding environments).

The monitoring device 12 is capable of proposing a recommended maintenance or consumable replacement time, which is a more appropriate time than the set maintenance or consumable replacement time, based on the travel distance and the number of elapsed days of the vehicle 10 by acquiring operation information (state information including an operation time) as operation parameters originated by an operator of the vehicle 10, and by ascertaining a change of a travel state based on the acquired state information.

Analysis of Environment

FIG. 4 is a functional block diagram of the environment analysis controller 14 in FIG. 1 that executes control for analyzing state information and determining consumable replacement times. Blocks in FIG. 4 are classified according to functions, and do not limit the hardware configuration of the environment analysis controller 14.

The environment analysis controller 14 includes an information reception unit 50. The information reception unit 50 is connected to the steering wheel sensor 22, the wiper sensor 24, the headlight sensor 26, the accelerator sensor 28, the clutch sensor 30, and the brake sensor 32, and receives state information.

The information reception unit 50 is connected to an information type determination unit 52, and transmits the received state information to the information type determination unit 52. The information type determination unit 52 determines the type of the acquired state information.

A clock unit 54 is connected to the information type determination unit 52. The clock unit 54 tracks acquired times of various items of the state information, and an operation continuation time for each item of the acquired state information, and information regarding the tracked times (hereinafter, referred to as time information) is added to the acquired state information.

For example, in a case where state information is acquired from the headlight sensor 26, the turned-on time and a turn-on duration of the headlights 38 according to the operation of the headlight 38 are tracked.

State information may exist which does not require time information. For example, state information from the clutch sensor 30 is the number of operations of the clutch pedal 42 (the number of times of engagement and disengagement of the clutch plate). In a case where a travel situation is acquired from the navigation system 20, time information may not be required.

The information type determination unit 52 is connected to an information update unit 55, and accumulates state information in an information accumulating unit 56.

The information accumulating unit 56 acquires and accumulates the information regarding travel situation (refer to FIGS. 2A to 3C) of the vehicle 10 from the navigation system 20 of the on-board management computer 16 illustrated in FIG. 1.

As a result, as illustrated in Table 1, the information accumulating unit 56 classifies and manages state information (that is, operation parameters originated by the operator) according to the travel situations (refer to FIGS. 2A to 3C) of the vehicle 10.

The environment analysis controller 14 includes an operation situation monitoring unit 58 as an example of an estimation unit, and acquires information regarding the travel distance of the vehicle 10 and information regarding the number of elapsed days after registration of the vehicle 10 from the on-board management computer 16 illustrated in FIG. 1.

A basic replacement time storage unit 60 is connected to the operation situation monitoring unit 58. The basic replacement time storage unit 60 acquires information regarding time a consumable has been replaced, that is, information regarding execution of replacement of consumables from the on-board management computer 16, and stores the next replacement time of each consumable.

As illustrated in Table 2, the basic replacement time storage unit 60 stores a table of basic replacement times of consumables (in Table 2, the aforementioned example components specified as consumables). For example, the replacement time of the clutch pedal (including the clutch plate and the peripheral components thereof) 42 is dependent on the travel distance, and 70,000 km is a replacement time.

The replacement time of the engine oil is dependent on the travel distance and the number of elapsed days, and either of 5,000 km or 6 months, whichever comes first, is a replacement time.

The operation situation monitoring unit 58 is connected to an information reading unit 62 and a consumable replacement necessity/non-necessity determination unit 64 which is a correction unit.

The operation situation monitoring unit 58 monitors consumable replacement time information in the basic replacement time storage unit 60. When the consumable replacement times are reached, the operation situation monitoring unit 58 instructs the information reading unit 62 to read the state information from the information accumulating unit 56, and to transmit the state information to the consumable replacement necessity/non-necessity determination unit 64 (read instruction).

The operation situation monitoring unit 58 instructs the consumable replacement necessity/non-necessity determination unit 64 to replace consumables, the replacement times of which are reached (replacement instruction).

The consumable replacement necessity/non-necessity determination unit 64 determines whether or not replacement of consumables is required, based on the consumables specified according to the replacement instruction from the operation situation monitoring unit 58, and based on the state information from the information reading unit 62.

The consumable replacement necessity/non-necessity determination unit 64 is connected to a correction table storage unit 66 which serves as a correction unit. For example, the correction table storage unit 66 stores a correction table which is based on state information regarding consumable replacement times illustrated in Table 3.

In the correction table illustrated in Table 3, the basic replacement times in Table 2 are corrected with the state information regarding the consumables (in Table 3, the example components specified as consumables).

According to Table 2, a travel distance of 70,000 km is the replacement time of the clutch pedal (including the clutch plate and the peripheral components thereof) 42. This replacement time is determined based on the condition that the number of operations of the clutch pedal 42 is 1,000,000. In a case where the number of operations of the clutch pedal 42 is less than 1,000,000, a travelable distance is extended according to the number of operations of the clutch pedal 42.

That is, for example, in a case where the number of operations of the clutch pedal 42 is 800,000, it is determined that the replacement of the clutch pedal 42 is not required at a travel distance of 70,000 km, and in contrast, it is determined that the replacement of the clutch pedal 42 is required at a travel distance of 150,000 km.

The consumable replacement necessity/non-necessity determination unit 64 is connected to a replacement necessity/non-necessity information output unit 68.

In a case where a determination result from the consumable replacement necessity/non-necessity determination unit 64 is "necessity of replacement", the replacement necessity/non-necessity information output unit 68 notifies the operator of a relevant message via a notification device 70 (for example, an on-board monitor, an on-board speaker, or the like) mounted in the vehicle 10.

In a case where a consumable is replaced at a service center or the like, the on-board management computer 16 is notified of the fact that the consumable is replaced.

In a case where a determination result is "non-necessity of replacement", the replacement necessity/non-necessity information output unit 68 transmits a relevant message to the operation situation monitoring unit 58. The operation situation monitoring unit 58 monitors operation situations based on an extended replacement time (for example, replacement at a travel distance of 150,000 km).

Figure 5:
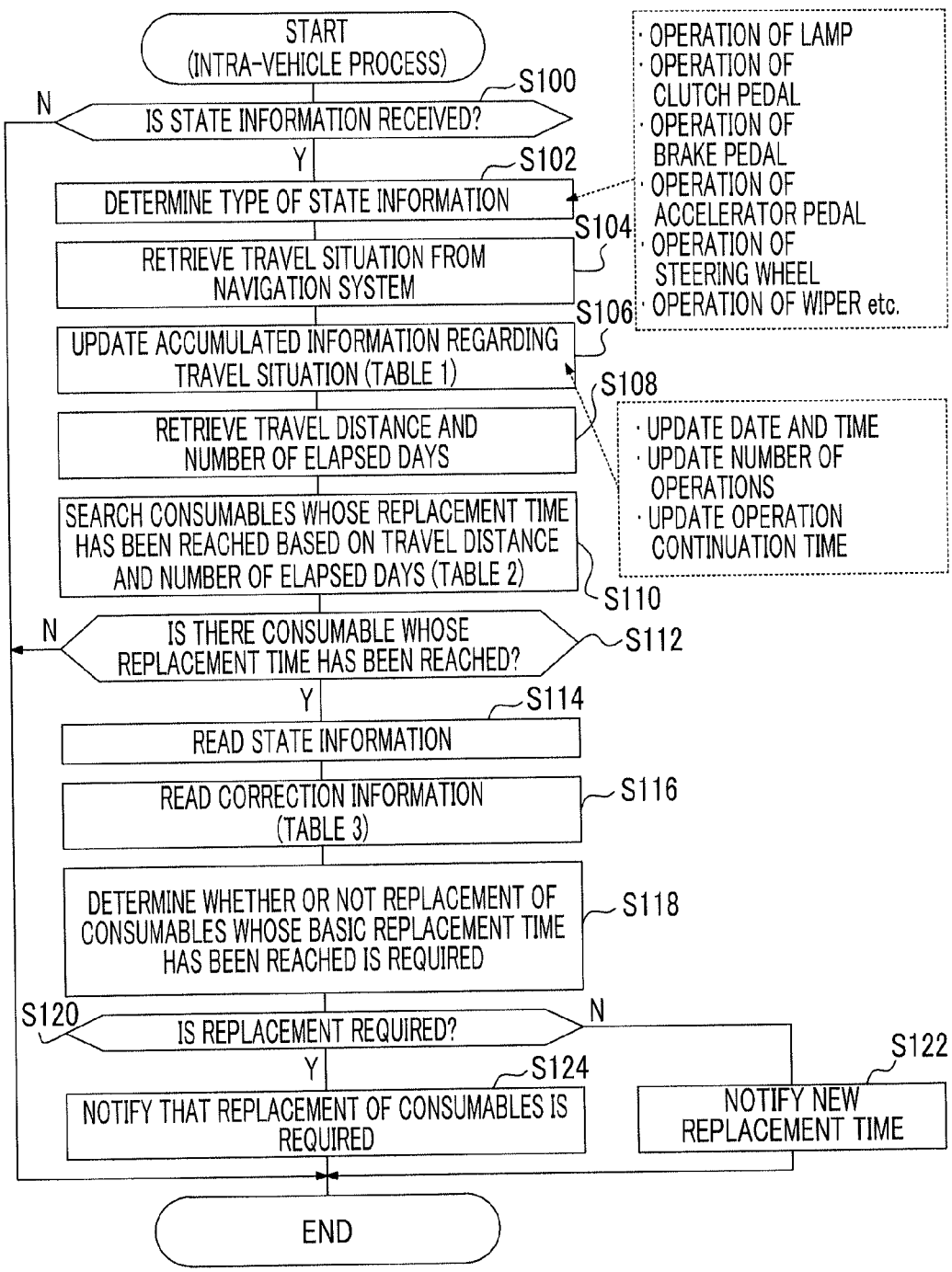
FIG. 5 is a flowchart illustrating control for specifying consumable replacement times based on operation state ascertaining control, according to the first exemplary embodiment.

Hereinafter, an operation in the first exemplary embodiment will be described. FIG. 5 is a flowchart illustrating control for specifying consumable replacement times based on operation state ascertaining control, according to the first exemplary embodiment.

In Step 100, it is determined whether or not state information is received from the various sensors such as the steering wheel sensor 22, the wiper sensor 24, the headlight sensor 26, the accelerator sensor 28, the clutch sensor 30, and the brake sensor 32. In a case where the determination in Step 100 is negative, the routine ends.

In a case where the determination in Step 100 is positive, the routine proceeds to Step 102, and the type of the state information is determined. Subsequently, the routine proceeds to Step 104, travel situations are retrieved from the navigation system 20, and the routine proceeds to Step 106.

In Step 106, the state information already accumulated is updated. The updating includes an update of date and time, an update of the number of operations, and an update of an operation continuation time, and is classified and performed according to travel situations (a combination of traveled road surfaces and time zones) (refer to Table 1).

Subsequently, in Step 108, information regarding the travel distance and information regarding the number of elapsed days are retrieved from the on-board management computer 16. Subsequently, the routine proceeds to Step 110, consumables whose basic replacement times have been reached are searched based on the travel distance and the number of elapsed days (refer to Table 2), and the routine proceeds to Step 112.

In Step 112, it is determined whether or not there is a consumable, the replacement time of which is reached. In a case where the determination is negative, that is, in a case where there is no consumable, the replacement time of which is reached, the routine ends.

In a case where the determination is positive in Step 112, that is, in a case where there is a consumable, the replacement time of which is reached, the routine proceeds to Step 114, and the state information is read from the information accumulating unit 56 in which the state information is accumulated.

Subsequently, in Step 116, the table (refer to Table 3) is read from the correction table storage unit 66 storing the table, and the routine proceeds to Step 118.

In Step 118, based on Table 3, it is determined whether or not replacement of the consumables, the basic replacement times of which are reached, is required in actuality (necessity/non-necessity of replacement).

Subsequently, in Step 120, it is determined whether or not the replacement of the consumables is required. In a case where the determination is negative, that is, in a case where it is determined that the replacement of the consumables is not required, the routine proceeds to Step 122, the operation situation monitoring unit 58 is notified of new replacement times, and the routine ends.

In Step 120, in a case where the determination is positive, that is, in a case where it is determined that the replacement of the consumables is required, the routine proceeds to Step 124, the operation situation monitoring unit 58 is notified that the replacement of the consumables is required, and the routine ends.

EXAMPLE 1

Hereinafter, an example (Example 1) of the first exemplary embodiment, in which a consumable replacement time is specified, will be described.

Table 1 illustrates the values (relative values) of the operation parameters originated by the operator of the vehicle 10, and travel situations.

As illustrated in Table 1, it is ascertained that the values of the operation parameters (an operation state (turn-on duration and the number of turn-ons and turn-offs) of the headlights 38, an operation state (the times of engagement and disengagement) of the clutch pedal 42, an operation state (the number of presses) of the brake pedal 44, an operation state (the number of presses) of the accelerator pedal 40, an operation state (the number of turns) of the steering wheel 34, and an operation state (turn-on duration and the number of turn-ons and turn-offs) of the wipers 36) originated by the operator are changed according to travel situations such as an expressway, a mountain road, weather, day, and night.

For example, the number of operations (engagement and disengagement) of the clutch pedal 42 differs between an expressway and a mountain road, or between rainy weather and good weather.

TABLE 1

Values (Relative Values) of Operation Parameters Originated by Operator of Vehicle and Travel Situations

| Operation Parameter Originated by Operator | Expressway/General Paved Road | | | | Mountain Road/General Unpaved Road | | | |
|---|---|---|---|---|---|---|---|---|
| | Good Weather | | Rain | | Good Weather | | Rain | |
| | Day (1) | Night (2) | Day (3) | Night (4) | Day (5) | Night (6) | Day (7) | Night (8) |
| Turn-on Duration and Number of Turn-ons of Headlight | 0 | 100 | 30 | 100 | 10 | 100 | 40 | 100 |
| Number of Engagement and Disengagement of Clutch Pedal | 10 | 15 | 20 | 25 | 70 | 90 | 80 | 100 |
| Number of Brake-Pedal Presses | 5 | 10 | 15 | 20 | 50 | 70 | 80 | 100 |
| Number of Accelerator-Pedal Presses | 10 | 10 | 10 | 10 | 100 | 90 | 90 | 80 |
| Number of Steering Wheel Turns | 5 | 10 | 10 | 15 | 100 | 90 | 90 | 90 |
| Turn-on Duration and Number Of Turn-ons of Wiper | 0 | 1 | 100 | 100 | 2 | 4 | 100 | 100 |

In Table 2, replacement times are defined based on the basic travel distance and the number of elapsed days.

TABLE 2

Table on Basic Replacement Times of Consumables

| Consumable | Parameter | Value |
|---|---|---|
| Clutch Pedal | Travel Distance | 70,000 km |
| Brake Pad | Travel Distance | 40,000 km |
| Engine Oil | Travel Distance/Time Period | 5,000 km/6 months |
| Battery | Time Period | 2.5 years |
| Belt | Travel Distance | 50,000 km |
| Spark Plug | Travel Distance | 25,000 km |

Table 3 illustrates consumable replacement times in this example.

Typically, consumable replacement time is defined only based on the travel distance and the number of elapsed days.

In this example, it is possible to accurately propose replacement times by taking the values of the operation parameters, which are originated by the operator and indicate operation environments, into consideration in determining the replacement times, in addition to the travel distance and the number of elapsed days.

As illustrated in Table 3, for example, with regard to the clutch pedal 42, the number of operations (engagement and disengagement) of the clutch pedal 42 is added as information for determination of the replacement time, in addition to the travel distance.

With regard to the brake pad, the number of brake-pedal presses is added as information for determination of the replacement time, in addition to the travel distance.

With regard to the engine oil, the number of accelerator-pedal presses is added as information for determination of the replacement time, in addition to the travel distance.

With regard to the battery, the turn-on duration of the headlights 38 is added as information for determination of the replacement time, in addition to the number of elapsed days.

Table 3 illustrates a portion (example components) of related components. This method may be applied to consumables and periodic replacement components other than the example components.

With regard to selecting one or more operation parameters, which are originated by the operator of the vehicle 10, for each consumable (component) to be replaced, highly-affected operation parameters originated by the operator of the vehicle 10 may be specified as added state information, based on failure data of consumables which have been replaced in the past.

TABLE 3

Consumable Replacement Times

| Consumable | Parameter | Value |
|---|---|---|
| Clutch Pedal | Travel Distance | 70,000 km/1,000,000 times |
| | Number of Engagement and Disengagement of Clutch Pedal | 150,000 km/800,000 times<br>200,000 km/600,000 times |
| Brake Pad | Travel Distance | 30,000 km/10,000 times |
| | Number of Brake-Pedal Presses | 40,000 km/5,000 times<br>50,000 km/2,000 times |
| Engine Oil | Travel Distance/Time Period | 7,000 km/8 months/2,000 times<br>5,000 km/6 months/2,500 times |
| | Number of Accelerator-Pedal Presses | 3,000 km/4 months/3,500 times |
| Battery | Time Period | 4 years/1,000 hours |
| | Turn-on Duration of Light | 2.5 years/2,000 hours<br>1.5 years/3,000 hours |
| Spark Plug | Travel Distance | 15,000 km/3,500 times |
| | Number of Accelerator-Pedal Presses | 25,000 km/2,500 times<br>35,000 km/2,000 times |

A life of the clutch pedal 42 will be exemplarily described with reference to FIGS. 6A and 6B.

In a comparative example, for a clutch 1 in FIG. 6B, it is recommended that the clutch pedal 42 should be replaced at travel distance M in the vicinity of 70,000 km, at which a wear rate of the clutch pedal 42 is 50%. In contrast, in a case where travel distance M (70,000 km) is equally used as a replacement time of clutches 1, 2, and 3, it is ascertained that the clutches 2 and 3 are replaced even though the clutches 2 and 3 may be sufficiently used.

Figure 6A:
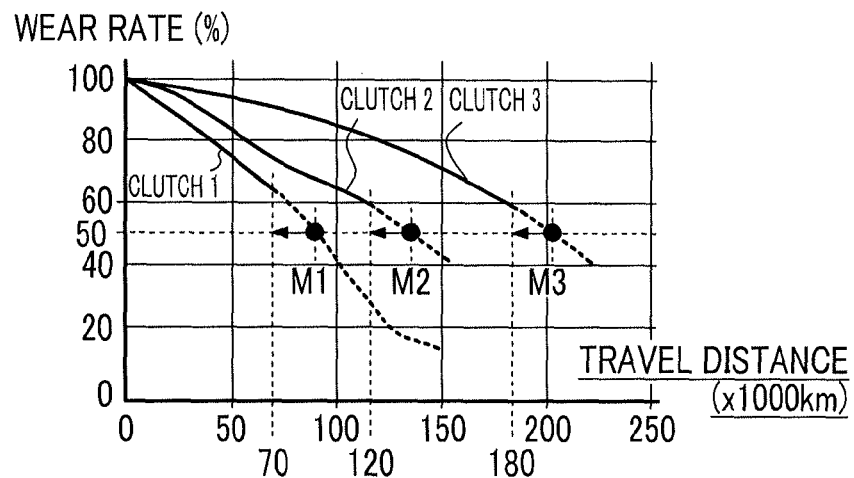

That is, as illustrated in FIG. 6A, a proper replacement time of the clutch 2 is estimated to be 120,000 km or longer, and a proper replacement time of the clutch 3 is estimated to be 180,000 km or longer.

It is considered that during replacement of the clutch pedal 42 or the like, a replacement operation of a component such as an engine or a transmission, which is moved from a vehicle body, is performed at 70,000 km, and the replacement is postponed in a case where the component is thoroughly checked and sufficient component life remains. In this case, the time and cost of the operation, which have been already performed for replacement, occur.

As illustrated in FIG. 6A, it is possible to properly estimate a change of the wear rate or the like for each of the clutches 1 to 3 by taking the number of operations (engagement and disengagement) (refer to Table 3) of the clutch pedal 42, which is considerably related to the life of the clutch pedal 42, into consideration.

FIG. 7B is a table illustrating comparison of travel distances of the clutches 1 to 5 which are criteria for determination of the replacement time in a case where the number of operations (engagement and disengagement) of the clutch pedal 42 is taken into consideration.

Figure 7A:
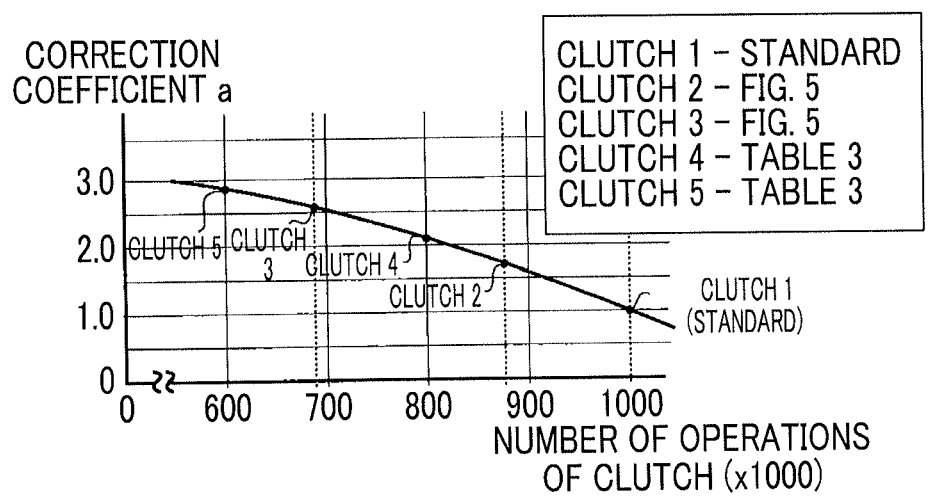
FIG. 7A is a characteristic graph illustrating a relationship between a clutch replacement travel distance and a correction coefficient of a clutch.

FIG. 7A illustrates a relationship between the number of operations (engagement and disengagement) of the clutch pedal 42 based on FIG. 7B and a correction coefficient a (correction coefficient a that is integrated into the basic replacement time (70,000 km) of the clutch pedal 42) used to obtain replacement travel distances of the clutches 1 to 5.

As illustrated in FIG. 7A, it is ascertained that the number of operations (engagement and disengagement) of the clutch pedal 42 and the correction coefficient, which is integrated into the replacement time (70,000 km) of the clutch pedal, have a linear relationship (a substantially proportional relationship).

It is possible to more properly estimate a replacement time of a consumable by ascertaining not only the travel distance but also state information based on travel situations.

It is possible to accurately ascertain a wear rate by taking a time period of riding the clutch into consideration based on time information. A sensor may be separately provided to detect riding the clutch.

Second Exemplary Embodiment

Hereinafter, a second exemplary embodiment will be described.

In the second exemplary embodiment, the monitoring device 12 mounted in the vehicle 10 is configured to have a communication function, and to collectively manage state information. The configuration of the monitoring device 12 according to the second exemplary embodiment will be described with reference to FIG. 8. The same reference signs will be assigned to the same configuration elements as those in the first exemplary embodiment, and a description of the configuration thereof will be omitted.

Figure 8:
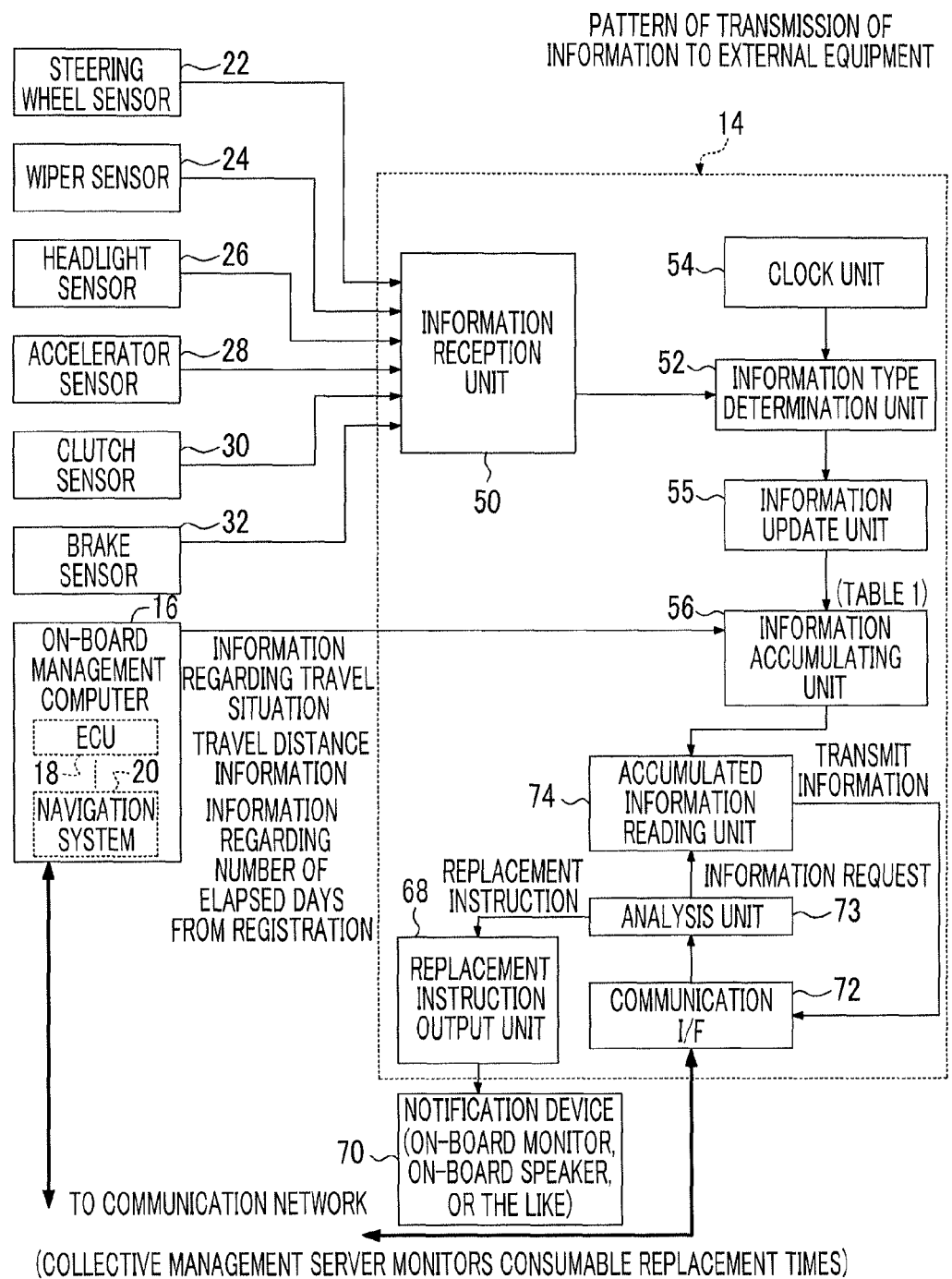
FIG. 8 is a functional block diagram of an environment analysis controller that performs control for analyzing state information and determining a consumable replacement time, according to a second exemplary embodiment.

As illustrated in FIG. 8, the monitoring device 12 according to the second exemplary embodiment includes a communication I/F 72. The communication I/F 72 is connected to the on-board management computer 16 and a communication network 80 (refer to FIG. 9).

The communication I/F 72 is connected to an analysis unit 73. The analysis unit 73 analyzes information (an information request and a replacement instruction) received by the communication I/F 72. The analysis unit 73 is connected to an accumulated information reading unit 74 and a replacement instruction output unit 68.

In a case where an analysis result from the analysis unit 73 is an information request, the information request is transmitted to the accumulated information reading unit 74.

The accumulated information reading unit 74 is connected to the information accumulating unit 56, and reads information (state information) regarding the vehicle 10.

The state information read by the accumulated information reading unit 74 is transmitted to the communication network 80 via the communication I/F 72, and to a collective management server 82 (to be described later) (refer to FIG. 9).

In a case where the analysis result from the analysis unit 73 is a replacement instruction, the replacement instruction is transmitted to the replacement instruction output unit 68.

That is, a main task of the monitoring device 12 (the environment analysis controller 14) in the second exemplary embodiment is the collection of state information, and a consumable replacement time is dependent on an instruction from the collective management server 82.

Figure 9:
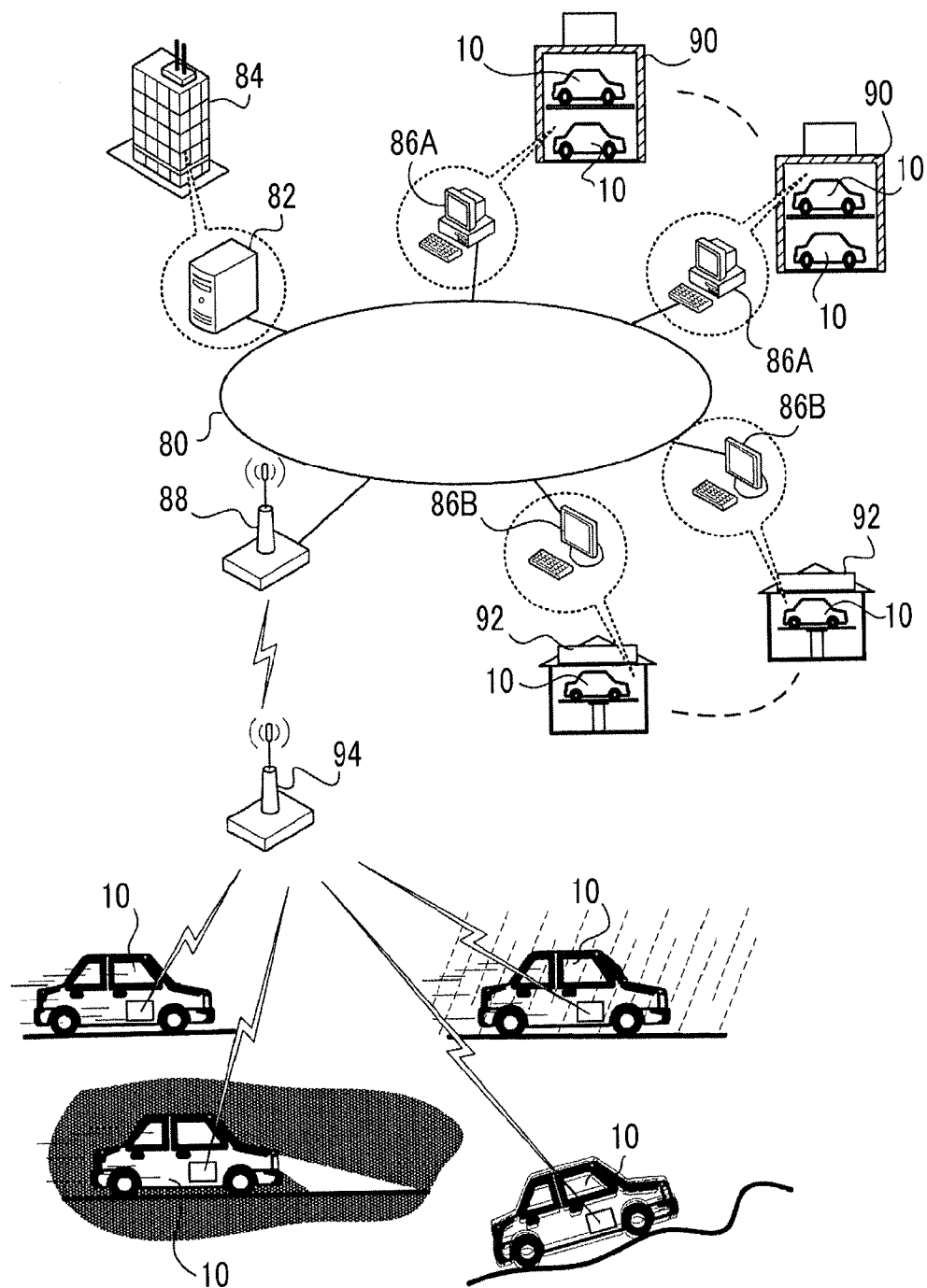
FIG. 9 is a diagram illustrating a monitoring system according to the second exemplary embodiment which collectively accumulates data from a monitoring device which is mounted on a vehicle, via a communication network, and optimizes a consumable replacement time.

FIG. 9 illustrates a monitoring system which collectively accumulates data from the monitoring device 12 which is mounted on a vehicle 10, via the communication network 80, and optimizes a consumable replacement time.

The monitoring system includes the communication network 80. Representative examples of the communication network 80 include Internet, a WAN, and a LAN.

The collective management server 82 is connected to the communication network 80. The collective management server 82 is provided in a building 84 of a manufacturer of the vehicle 10. The collective management server 82 acquires state information regarding each of the vehicles 10 in all regions in which the vehicles 10 are distributed, or from the vehicles 10 which are present in a specific region.

The communication network 80 is connected to a PC 86A or 86B and a wireless communication device 88 which are communication terminals.

The PC 86A is provided at a main repair shop 90 of a dealer (distributor) of the vehicles 10. When repair of the vehicle 10 is requested, state information regarding the vehicle 10 to be repaired is transmitted to the collective management server 82 via the PC 86A.

The PC 86B is provided at a so-called non-dealer repair shop 92. When repair of the vehicle 10 is requested, state information regarding the vehicle 10 to be repaired is transmitted to the collective management server 82 via the PC 86B.

The wireless communication device 88 is capable of communicating with communication base stations 94 installed in all regions in which the vehicles 10 are distributed, or in a specific region.

As illustrated in FIG. 8, the communication I/F 72 provided in the monitoring device 12 of each of the vehicles 10 is configured to transmit state information to each of the communication base stations 94. For this reason, even if the main repair shop 90 or the non-dealer repair shop 92 is not requested to repair the vehicle 10, the collective management server 82 is capable of retrieving routine state information or travel situations of the vehicle 10 insofar as the vehicle 10 is present within a communication range of the communication base station 94. For this reason, the collective management server 82 manages so-called big data regarding the vehicles 10.

The routine state information regarding the vehicle 10 is state information that is detected by the steering wheel sensor 22, the wiper sensor 24, the headlight sensor 26, the accelerator sensor 28, the clutch sensor 30, and the brake sensor 32 in the travel states of the vehicle 10 illustrated in FIGS. 2A and 2B, and in the surrounding environmental states of the vehicle 10 illustrated in FIGS. 3A to 3C.

Hereinafter, an operation in the second exemplary embodiment will be described.

FIG. 10A is a flowchart illustrating control for managing consumable replacement based on the collection and notification of state information, which is executed by the environment analysis controller 14 of each of the vehicles 10. In the flowchart illustrated in FIG. 10A, reference sign "A" is attached to the end of the same step numbers of the same steps as in the flowchart illustrated in the first exemplary embodiment with reference to FIG. 5.

In Step 100A, it is determined whether or not state information is received from the various sensors such as the steering wheel sensor 22, the wiper sensor 24, the headlight sensor 26, the accelerator sensor 28, the clutch sensor 30, and the brake sensor 32. In a case where the determination in Step 100A is negative, the routine proceeds to Step 123.

In a case where the determination in Step 100A is positive, the routine proceeds to Step 102A, and the type of the state information is determined. Subsequently, the routine proceeds to Step 104A, travel situations are retrieved from the navigation system 20, and the routine proceeds to Step 106A.

In Step 106A, the state information already accumulated is updated. The updating includes an update of date and time, an update of the number of operations, and an update of an operation continuation time, and is classified and performed according to travel situations (a combination of traveled road surfaces and time zones) (refer to Table 1).

Subsequently, in Step 121, information regarding the travel distance and information regarding the number of elapsed days from registration are retrieved from the on-board management computer 16, and are updated along with the state information, and the routine proceeds to Step 123.

In Step 123, it is determined whether or not there is a consumable replacement instruction from the collective management server 82. In a case where the determination in Step 123 is positive, that is, in a case where there is a consumable replacement instruction, the routine proceeds to Step 124A, consumable replacement is notified, and the routine proceeds to Step 126.

In a case where the determination in Step 123 is negative, that is, in a case where there is no consumable replacement instruction, the routine proceeds to Step 126.

In Step 126, it is determined whether or not there is an information request via the communication network 80. Examples of an information requestor include the PC 86A of the main repair shop 90 or the PC 86B of the non-dealer repair shop 92.

For example, a program is run on the on-board management computer 16 so as to periodically transmit state information to the collective management server 82. When time for the transmission is reached, the on-board management computer 16 outputs a communication request to the environment analysis controller 14.

When a repair is performed, the PC 86A of the main repair shop 90 or the PC 86B of the non-dealer repair shop 92 is connected to the environment analysis controller 14 via a dedicated cable, and requests state information.

In a case where it is determined that there is an information request in Step 126, the routine proceeds to Step 128, state information accumulated in the information accumulating unit 56 is transmitted to a requestor, and the routine ends. In a case where there is no communication request in Step 126, the routine ends.

Figure 10B:
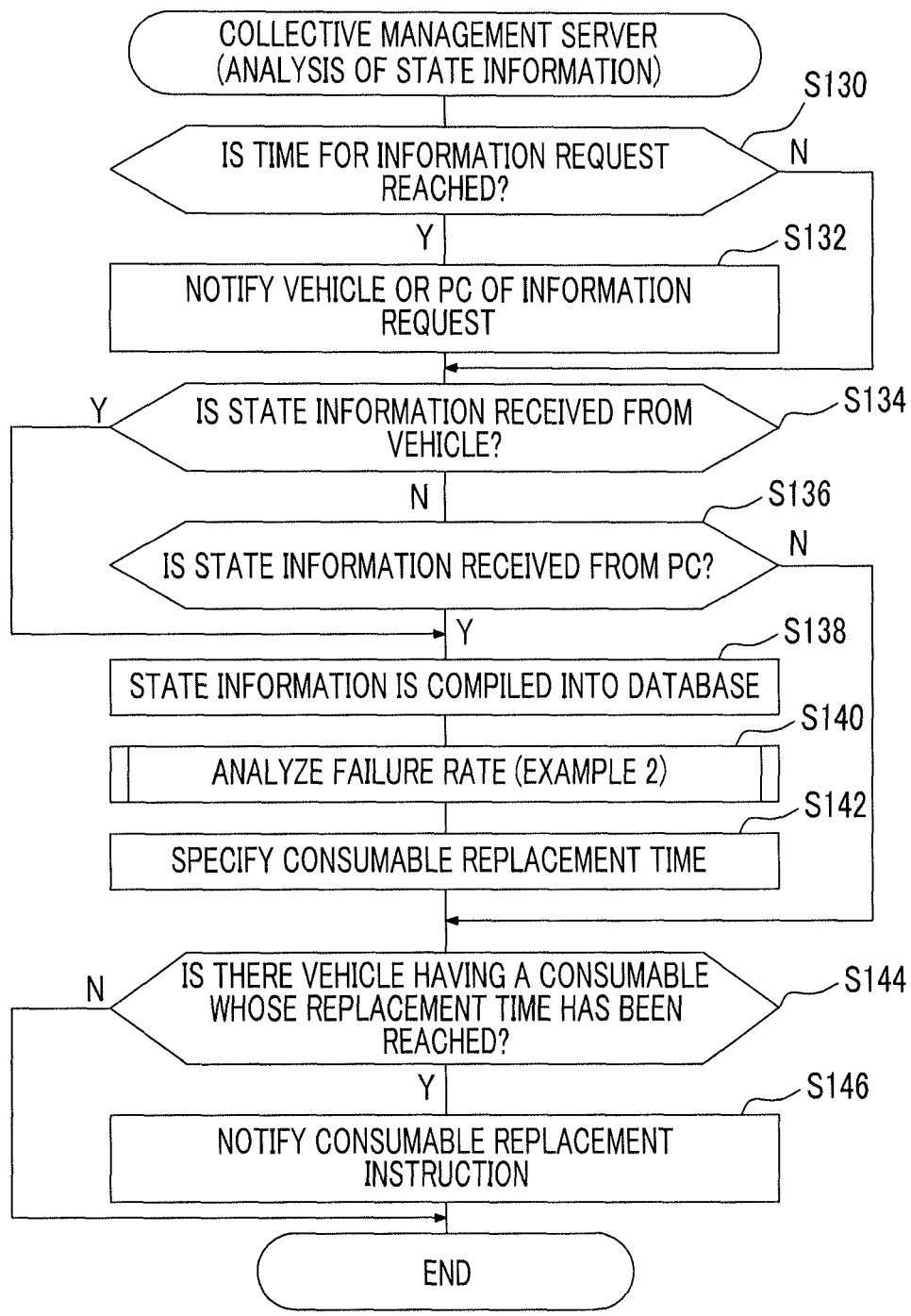
FIG. 10B is a flowchart illustrating control for specifying a consumable replacement time based on operation state ascertaining control, which is executed by a collective management server, according to the second exemplary embodiment.

FIG. 10B is a flowchart illustrating control for specifying a consumable replacement time based on operation state ascertaining control, which is executed by the collective management server 82.

In Step 130, it is determined whether or not a time of a request of state information is reached. The request time may be periodic or non-periodic.

In a case where the determination in Step 130 is positive, the routine proceeds to Step 132, a request for state information is notified to the vehicle 10 and the PC 86A or 86B, and the routine proceeds to Step 134. In a case where the determination in Step 130 is negative, the routine proceeds to Step 134.

In Step 134, it is determined whether or not state information is received from the vehicle 10. In a case where the determination is negative, the routine proceeds to Step 136, and it is determined whether or not state information is received from the PC 86A or 86B. In a case where the determination in Step 134 or 136 is positive, the routine proceeds to Step 138. In a case where the determination in Step 136 is negative, the routine proceeds to Step 144.

In Step 138, the received state information is compiled into a database. Subsequently, the routine proceeds to Step 140, a failure rate analysis process for each type of state information is executed. The failure rate analysis process will be described in detail in Second Example hereinbelow.

Subsequently, in Step 142, consumable replacement times are specified based on the failure rate analysis process, and the routine proceeds to Step 144.

In Step 144, it is determined whether or not there is the vehicle 10 having a consumable whose replacement time has been reached. In a case where the determination in Step 144 is negative, the routine ends.

In a case where the determination in Step 144 is positive, the routine proceeds to Step 146, a consumable replacement instruction is notified, and the routine ends.

The consumable replacement instruction may be directly notified from the collective management server 82 to the environment analysis controller 14 of the vehicle 10, or to the PC 86A of the main repair shop 90 or the PC 86B of the non-dealer repair shop 92.

In a case where the PC 86A of the main repair shop 90 or the PC 86B of the non-dealer repair shop 92 receives the consumable replacement instruction, the PC 86A of the main repair shop 90 or the PC 86B of the non-dealer repair shop 92 determines whether or not there is the corresponding vehicle 10 among the vehicles 10 on a customer management register, and notifies the environment analysis controller 14 of the vehicle 10 of the determination. Alternatively, guidance may be given to a customer via a direct call or a mail.

EXAMPLE 2

Hereinafter, an example (Example 2) of the second exemplary embodiment, in which the collective management server 82 analyzes the collectively managed state information regarding each of the vehicles 10, will be described (equivalent to Step 140 in FIG. 10A).

(a) Steering Wheel

Figure 11:
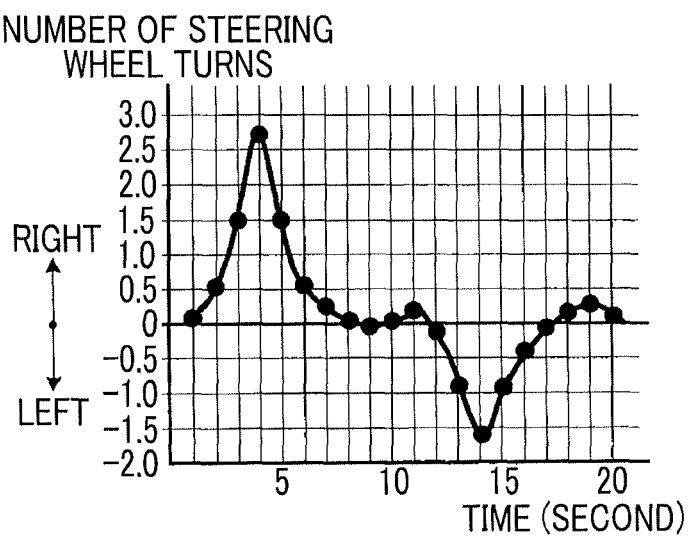
FIG. 11 is a characteristic graph illustrating information regarding the number of steering wheel turns according to the second exemplary embodiment.

FIG. 11 illustrates an example of the pattern of a change in the rotational angle (steering angle) of the steering wheel, which is an operation parameter.

In a case where the steering wheel is frequently turned, for example, the vehicle travels a curve or a corner, or enters a garage or the like, a time series change of the number of steering wheel turns (angle) is increased.

Table 4 illustrates the results of readjusting the characteristic graph in FIG. 11, for example, collecting the number of steering wheel turns during one month.

TABLE 4

Number of Steering Wheel Turns of Vehicles A to D
(2.7 Turns ≈ Steering Angle 30 Degrees

|  |  | Number of Steering Wheel Turns | | | | |
|---|---|---|---|---|---|---|
|  |  | Less than 0.5 | 0.5 to 1.0 | 1.0 to 1.5 | 1.5 to 2.0 | Exceeding 2.0 |
| Number of Occurrences (During 1 month) | Vehicle A | 15 | 33 | 55 | 96 | 100 |
|  | Vehicle B | 20 | 20 | 25 | 25 | 30 |
|  | Vehicle C | 50 | 33 | 43 | 45 | 40 |

A threshold value is set for the number of occurrences of turning the steering wheel in each range during a data collection period such that necessity of maintenance may be specified from performance data of configuration components of the steering wheel at the occurrence of a failure in the past, and may be proposed prior to the occurrence of a failure.

Figure 12:
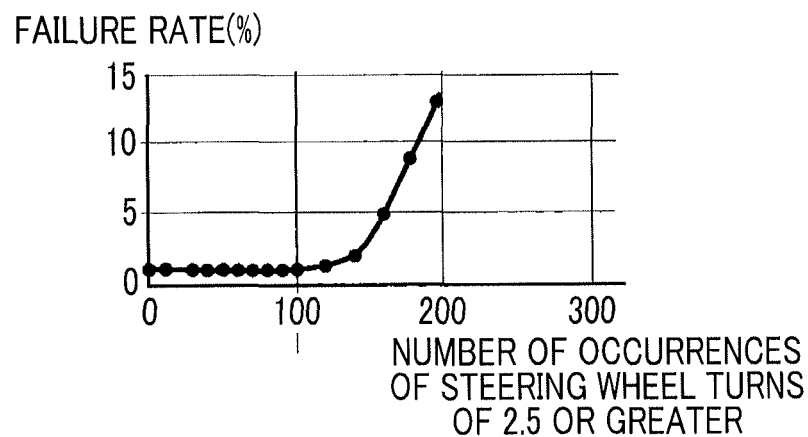
FIG. 12 is a characteristic graph illustrating a relationship between the number of steering wheel turns and a failure rate according to the second exemplary embodiment.

For example, as illustrated in FIG. 12, in a case where the number of occurrences of turning the steering wheel 2.5 times or more is related to a failure, it is possible to cope with the failure prior to the occurrence of the failure by recommending that performance of the configuration components of the steering wheel should be checked or replaced when the number of occurrences of turning the steering wheel turns 2.5 times or more is 100 or more.

(b) Shift

Figure 13:
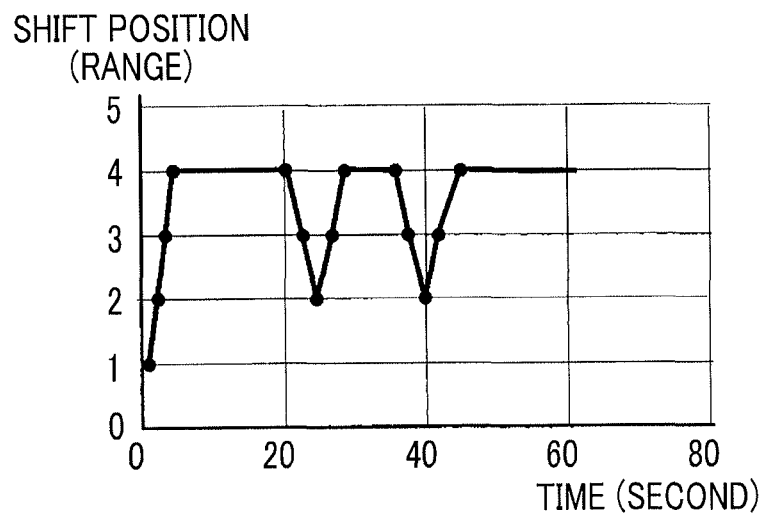
FIG. 13 is a characteristic graph illustrating the transition of a shift position according to the second exemplary embodiment.

FIG. 13 illustrates an example of the pattern of a change in the times of engagement at each shift position of a transmission over time, which is an operation parameter.

In a case where the vehicle 10 travels on a steep uphill road, a steep downhill road, or a road on which corners frequently appears, a shift timing tends to be delayed, and the times of engagement tends to be increased.

Table 5 illustrates the results of readjusting the characteristic graph in FIG. 13, for example, collecting the times of shifting and shift hours during one month.

TABLE 5

Times of Shifting into Shift Positions and Shift Hours of Vehicles A to D

|  |  | Shift Position | | | | | | | |
|---|---|---|---|---|---|---|---|---|---|
|  |  | First Shift Position | | Second Shift Position | | Third Shift Position | | Fourth Shift Position | |
|  |  | Times of Shifting | Shift Hours (H) | Times of Shifting | Shift Hours (H) | Times of Shifting | Shift Hours (H) | Times of Shifting | Shift Hours (H) |
| Number of Occurrence (During 1 month) | Vehicle A | 600 | 1.0 | 500 | 2.0 | 400 | 3.0 | 300 | 10 |
|  | Vehicle B | 200 | 0.2 | 200 | 1.0 | 250 | 1.5 | 300 | 6 |
|  | Vehicle C | 500 | 0.4 | 330 | 0.5 | 450 | 0.8 | 400 | 3.0 |
|  | Vehicle D | 0 | 0 | 0 | 0 | 0 | 0 | 0 | 0 |

A threshold value is set for the times of engagement at a shift position and a time during a data collection period such that necessity of maintenance may be specified from performance data of configuration components of the transmission at the occurrence of a failure in the past, and may be proposed prior to the occurrence of a failure.

Figure 14A:
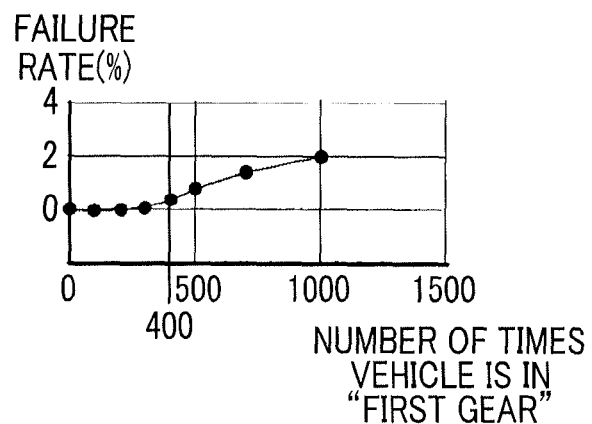
FIG. 14A is a characteristic graph illustrating a relationship between the times of shifting into "a first shift" position and a failure rate.
Figure 14B:
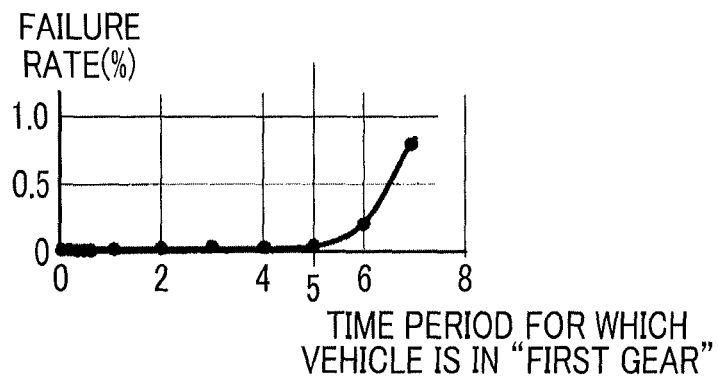
FIG. 14B is a characteristic graph illustrating a relationship between the set time of "the first shift" position and a failure rate, according to the second exemplary embodiment.

For example, it is possible to cope with a failure or the like prior to the occurrence of the failure or the like by recommending that performance of peripheral component of the transmission should be checked in a case where the number of times the vehicle is in the first gear is 400 or more as illustrated in FIG. 14A, or in a case where the time period for which the vehicle is in the first gear is five hours or longer as illustrated in FIG. 14B.

(c) Others

The method of presenting a recommended maintenance or replacement time of an operation-related configuration component based on (a) the number of steering wheel turns (angle) and (b) the state of a shift change of the transmission has been described. Similarly, with regard to the accelerator pedal, the brake pedal, and the like other than the steering wheel and the transmission, which are related to operability, it is possible to propose a recommended maintenance or replacement time of a consumable or a component by collecting and processing data indicating the state of a change of each parameter.

In the aforementioned examples, a recommended maintenance or replacement time is proposed based on a time series change of each parameter in the data process. Alternatively, it is possible to propose a recommended maintenance or replacement time of an operation-related configuration component, into which more operation states are taken, by ascertaining the state of changes of plural parameters, that is, all parameters such as the number of steering wheel turns (angle), a transmission shift position/time, and the number of accelerator-pedal presses, and by setting a threshold value for a combination of the values of the plural parameters.

According to the first and second exemplary embodiments, it is possible to ascertain a travel state by ascertaining the number of operations, an operation time, or the like for each parameter which is related to estimatable operation environments of the vehicle 10. Accordingly, it is possible to propose proper recommended replacement or maintenance of a related component.

It is possible to improve the situation in which a component may be replaced which may be still sufficiently used, according to the definition of component replacement based on a travel distance and the number of elapsed days which are typical parameters, or an accident may occur due to the occurrence of a failure of a related component prior to the defined travel distance being reached, depending on a travel state. It is possible to propose an optimized consumable replacement time for each of the vehicles 10 according to a travel state. As a result, it is possible to reduce maintenance costs, and to further increase safety.

In the first and second exemplary embodiments (including Examples 1 and 2), the vehicle 10 is described as an example of a moving object. Other objects such as a train, a ship, and an aircraft may be used.

By general definition, a living body such as a human and an animal may be included as an example of a moving object. In the first and second exemplary embodiments (including Examples 1 and 2), basically, a moving object does not include a living body. In contrast, in a living body who uses a medical assistance tool that is represented by an artificial leg, an artificial arm, and a wheelchair, the degree of consumption of the medical assistance tool may be determined by detecting motions of the living body. In a case where the degree of consumption of a tool (tool which is mounted and used in a living body), which is represented by such a medical assistance tool, is determined, a living body may be included as an example of a moving object.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A monitoring device comprising:
an estimation unit that estimates a degree of degradation of a moving object based on at least an amount of movement of the moving object;
one or more sensors that detect an environment state of the moving object at a time when the moving object is moved, as operation parameter values, the operation parameter values including: (i) the number of operations performed by an operation unit, and (ii) a duration of time of the operations performed by the operation unit; and
a correction unit that corrects the degree of degradation, which is estimated by the estimation unit, based on the operation parameter values detected by the one or more sensors,
wherein a controller is configured to act as the estimation unit and the correction unit.

2. The monitoring device according to claim 1,
wherein the moving object is an automobile, and
wherein the operation of the operation unit includes at least one operation of a turn-on operation of a lamp provided in the automobile, an activation operation of a wiper, a turning operation of a steering wheel, a pressing operation of an accelerator, a pressing operation of a brake, a pressing operation of a clutch, and a shifting operation of a gear.

3. The monitoring device according to claim 2,
wherein the environment state of the moving object is ascertained from a time series operation situation of an applied operation value within a predetermined time period.

4. The monitoring device according to claim 3,
wherein the estimation unit estimates a replacement time of a consumable in the moving object which is to be replaced when reaching a predetermined degree of degradation.

5. The monitoring device according to claim 2,
wherein the estimation unit estimates a replacement time of a consumable in the moving object which is to be replaced when reaching a predetermined degree of degradation.

6. The monitoring device according to claim 1,
wherein the environment state of the moving object is ascertained from a time series operation situation of an applied operation value within a predetermined time period.

7. The monitoring device according to claim 6,
wherein the estimation unit estimates a replacement time of a consumable in the moving object which is to be replaced when reaching a predetermined degree of degradation.

8. The monitoring device according to claim 1,
wherein the estimation unit estimates a replacement time of a consumable in the moving object which is to be replaced when reaching a predetermined degree of degradation.

9. A monitoring device comprising:
an estimation unit that estimates a replacement time of a consumable provided in an automobile based on at least a travel distance of the automobile and a number of days the automobile travels;
one or more sensors that detect an environment state of the automobile at a time when the automobile travels, as operation parameter values including
an amount of an operation of at least one operation of a turn-on operation of a lamp provided in the automobile, a wiping operation of a wiper, a turning operation of a steering wheel, a pressing operation of an accelerator, a pressing operation of a brake, a pressing operation of a clutch, and a shifting operation of a gear, and
an operation time of the at least one operation; and
a correction unit that corrects the replacement time of the consumable, which is estimated by the estimation unit, based on the operation parameter values detected by the one or more sensors,
wherein a controller is configured to act as the estimation unit and the correction unit.

10. A monitoring system comprising:
a plurality of monitoring devices that are respectively provided in a plurality of moving objects, each monitoring device including
an estimation unit that estimates a degree of degradation of the moving object based on at least an amount of movement of the moving object,
one or more sensors that detect an environment state of the moving object at a time when the moving object is moved, as operation parameter values including an amount of an operation and an operation time of an operation unit, and
an accumulating unit that accumulates the operation parameter values detected by the one or more sensors; and
a management server including
a retrieving unit that retrieves the operation parameter values accumulated in the accumulating units of the plurality of monitoring devices,
a correction unit that corrects the degrees of degradation which is estimated by the estimation units, based on the operation parameter values which are retrieved by the retrieving unit from the plurality of monitoring devices, and
a transmitting unit that transmits the degrees of degradation, which are corrected by the correction unit, to the monitoring devices,
wherein a controller is configured to act as the estimation unit, the accumulating unit, the retrieving unit, the correction unit, and the transmitting unit.

11. The monitoring system according to claim 10,
wherein the moving object is an automobile, and
wherein the operation of the operation unit includes at least one operation of a turn-on operation of a lamp provided in the automobile, a wiping operation of a wiper, a turning operation of a steering wheel, a pressing operation of an accelerator, a pressing operation of a brake, a pressing operation of a clutch, and a shifting operation of a gear.

12. The monitoring system according to claim 11,
wherein the environment state of the moving object is ascertained from a time series operation situation of an applied operation value within a predetermined time period.

13. The monitoring system according to claim 12,
wherein the estimation unit estimates replacement times of consumables in the moving objects which are to be replaced when reaching a predetermined degree of degradation.

14. The monitoring system according to claim 11,
wherein the estimation unit estimates replacement times of consumables in the moving objects which are to be replaced when reaching a predetermined degree of degradation.

15. The monitoring system according to claim 10,
wherein the environment state of the moving object is ascertained from a time series operation situation of an applied operation value within a predetermined time period.

16. The monitoring system according to claim 15,
wherein the estimation unit estimates replacement times of consumables in the moving objects which are to be replaced when reaching a predetermined degree of degradation.

17. The monitoring system according to claim 10,
wherein the estimation unit estimates replacement times of consumables in the moving objects which are to be replaced when reaching a predetermined degree of degradation.

* * * * *